March 14, 1961 D. B. BAUMAN 2,974,366
METHOD AND MACHINE FOR FORMING ARTICLES
FROM PLASTIC SHEET MATERIAL
Filed Nov. 8, 1957 2 Sheets-Sheet 1

INVENTOR.
Douglas B. Bauman
BY
Johnson and Kline
ATTORNEYS

March 14, 1961

D. B. BAUMAN 2,974,366

METHOD AND MACHINE FOR FORMING ARTICLES FROM PLASTIC SHEET MATERIAL

Filed Nov. 8, 1957

INVENTOR.
Douglas B. Bauman
BY
Johnson and Kline
ATTORNEYS

United States Patent Office 2,974,366
Patented Mar. 14, 1961

2,974,366

METHOD AND MACHINE FOR FORMING ARTICLES FROM PLASTIC SHEET MATERIAL

Douglas B. Bauman, New Haven, Conn., assignor to Applied Plastics, Inc., New Haven, Conn., a corporation of Connecticut Filed Nov. 8, 1957, Ser. No. 695,335

12 Claims. (Cl. 18—19)

This invention relates to a method and apparatus for forming articles from thermoplastic sheet material.

The invention provides improvements whereby, for example, polyhedral articles such as containers or other receptacles can be formed accurately with sharply defined corner portions heretofore not producible except by laboriously gluing or welding along the corner edges. Other conventional methods such as mechanical die forming or forming with the aid of air pressure distending heat-softened sheet material into a surrounding form, were incapable of operating in a satisfactory manner to produce articles with well defined corner portions. Forming the sheet material between conventional male and female die members while simultaneously forming the corners would tend to shear or rupture the material, whereas the air pressure forming method would leave the corners rounded or lacking the well defined corner sharpness obtainable by this invention.

It is among the objects to provide a simple inexpensive method for forming such containers with well defined corners, which avoids rupturing or shearing of the sheet material in the process.

To attain these objects, the invention in one form distends a determinate polygonal area of the heat-softened sheet material by first forming therein the vertical corner portions to provide a preliminary shape of the article, and then finish forming the portions between the corner portions.

According to the invention the material is placed over an opening in a base member and clamped marginally around the opening, then the area of heat-softened material as defined by the opening is shaped by mechanically engaging and distending a predetermined portion of the sheet to form the corners of the article. In the case of forming a container the corner portions of the sheet material are first mechanically engaged and distended to provide a preliminary shape defined by the corner portions thus distended. A finish forming operation is then applied whereby the preliminary shape is further mechanically distended to its final shape.

According to one embodiment of the invention which is exemplary thereof, corner forming devices are provided each of which has a pivotally mounted corner forming die member or finger swingable in a plane perpendicular to the sheet into vertical corner forming position. As the corners are thus being formed each by its corner forming member, an additional forming die member complementary to the corner forming fingers is applied interiorly to the preliminary shape of the article for finish forming the preliminary shape, so that the forming fingers together with the complementary forming member define the shape of the article.

Other features of the invention include applying suction interiorly of the container, whereby the container bottom may be drawn against a plain or ornamental backing surface to control the shape of the bottom. The backing surface may be held in a plane short of the tips of the corner forming fingers thereby providing corner pockets at the container bottom to serve as container legs.

Whereas this invention may be employed for producing polygonal articles other than containers or receptacles, the invention in a preferred form is herein illustrated to show the production of containers by the specially controlled manner of mechanically distending the heat-conditioned sheet material.

Other features and advantages will hereinafter appear.

Figure 1:
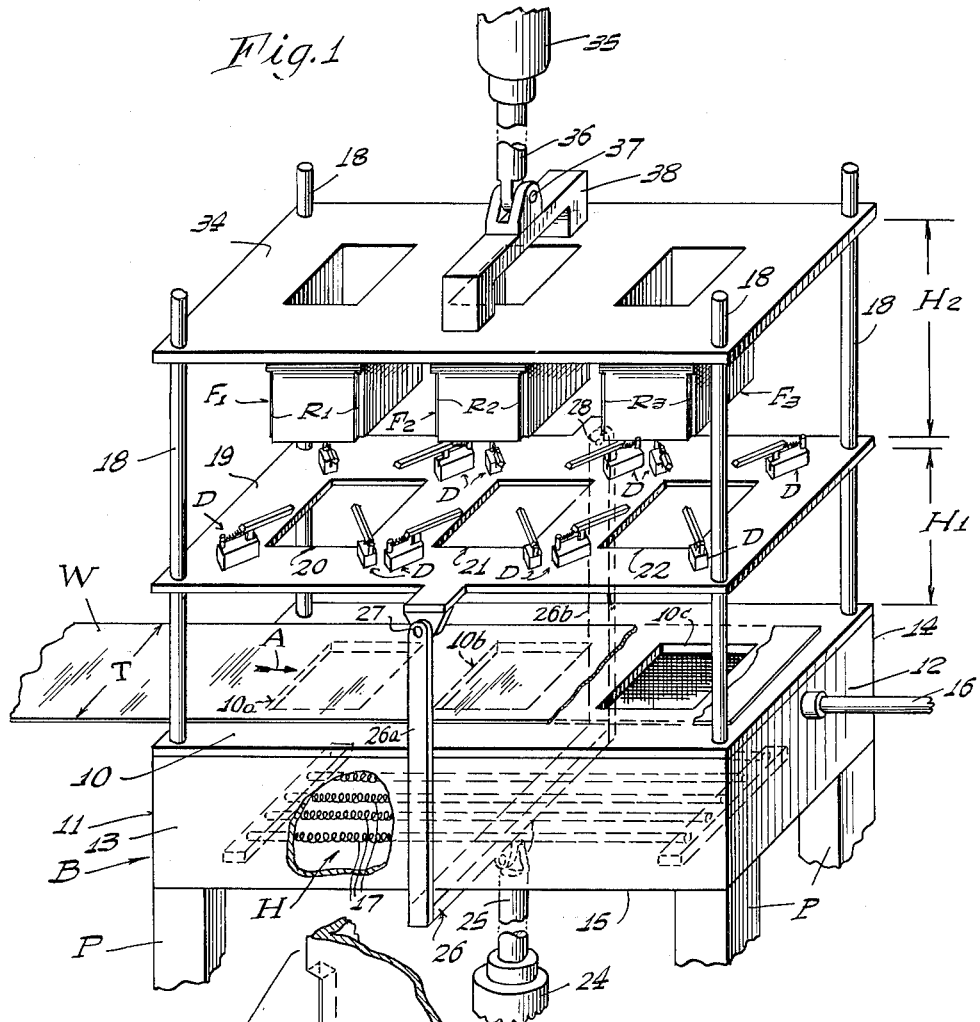
Figure 1 is a perspective view of one exemplary embodiment of apparatus for carrying out the method of forming plastic sheet material into polyhedral articles or containers, showing the forming devices in position prior to the start of the forming operation.

As an example embodying a form of practicing the method of this invention, the perspective view of Fig. 1 shows an apparatus in which thermoplastic sheeting in the form of a continuout strand or web W of the width T is slid lengthwise in the direction of arrow A onto a horizontal base plate 10 here shown to have a plurality of rectangular apertures or openings 10a, 10b, 10c arranged in a series longitudinally coextensive with the web. The web may be advanced so that the sheet material is placed over the openings, then to be clamped down marginally around the respective openings prior to initiating the forming operation described below.

The apertured base plate 10 represents the top of a rectangular box structure B fixedly supported on corner posts P and comprising end walls 11 and 12, side walls 13 and 14, and a bottom 15. This box structure provides a heating chamber H containing a plurality of heat radiating elements 17 serving to apply heat upwardly through the openings to heat-soften and render distendable the web portions defined by the respective areas of the openings, from which the articles or containers are to be formed.

Alternatively, the box structure in this embodiment will provide an air pressure chamber if desired in connection with the forming operation, an air pressure supply connection 16 being indicated in the wall 12 of the chamber. But when the chamber is under atmospheric pressure, an air blast as indicated by a nozzle N may be directed at an angle externally against the shaped container C (see Fig. 3) to restore the thermoplastic sheet material to its original non-plasticized state by cooling. From each corner of the box structure and rigidly connected therewith rises a vertical guide rod 18, upon which rods is vertically slidable a clamping plate 19 having a series of rectangular openings 20, 21, 22 substantially identical to, and matching those in the base plate 10. Actuating means for controlling the vertical movements of the clamping plate upon the guide rods comprise a hydraulic cylinder unit fragmentarily indicated at 24 disposed below the box structure B and having an extendible and retractable piston rod 25 operatively connected to the clamping plate by means of a link in the form of a vertically mounted yoke member 26 the sides or shanks 26a and 26b of which rise up past respective sides of the box structure to have pivotal connection 27 and 28 with the corresponding sides of the clamping plate. Retracting the piston rod 25 into the cylinder will lower the clamping plate into clamping engagement upon the web, whereby the sheet material will be clamped down marginally around the respective openings in preparation to the container forming operation proper.

Figure 2:
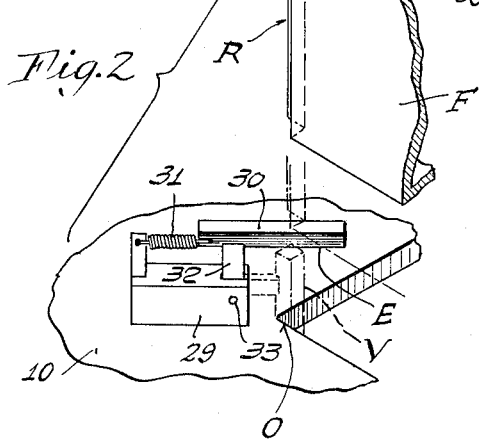
Fig. 2 is an enlarged detail perspective view of one of the corner forming devices in relation to the complementary forming die member cooperative therewith.

In one embodiment of the apparatus, the horizontal pressure plate has mounted on top thereof a set of corner forming devices D for each of the openings 20, 21, 22, one corner forming device being disposed at each corner of each opening, for forming the vertical corner portions of the respective containers in the manner to be described. The corner forming device has a base 29 fastened to the top face of the clamping plate. A corner forming die member or finger 30 is in turn pivotally mounted upon this base and has a spring 31 normally holding it substantially horizontally poised to point in a direction inwardly and diagonally with respect to the associated corner of the respective opening. The fingers in the embodiment shown are of square cross-sectional configuration and each has a corner forming edge E for shaping the vertical corner portions of the container when the fingers are swung from horizontal to vertical position as is illustrated in the detail perspective Figure 2. Accordingly, the finger 30 is rigidly connected to or formed with an arm or stem 32 which in turn is pivoted on pivot 33 on the base. In this way, when the finger is swung downwardly to the vertical position indicated at V in dot-and-dash, it will lodge vertically in the associated corner O of the respective aperture.

Each finger when brought to this vertical position in the course of a container-forming operation to be described below, will lodge in a corresponding vertical recess or relieved corner portion R of a mechanical forming means in the form of a complementary box-shaped forming die member F (see Fig. 2) cooperative with the corner-shaping fingers 30 in the manner described below and more fully illustrated in Figs. 1 and 3.

Accordingly, there is provided above the clamping plate a pressure plate 34 carrying the box-shaped complementary forming die members $F_1$, $F_2$, $F_3$ with their relieved corners $R_1$, $R_2$, $R_3$ respectively, extending downward from the pressure plate and in registry with the respective rectangular apertures in clamping plate 19 and base plate 10.

Like the clamping plate 19, the pressure plate 34 is movable vertically parallel to itself upon the aforementioned vertical guide rods 18. The means for moving the pressure plate 34, as here exemplified, comprise a hydraulic cylinder unit 35 fragmentarily shown with a retractable and extendible piston rod 36 having pivotal connection 37 topside with the pressure plate by way of a transversely extending bridge member 38 fixedly connected to or unitary with the plate. Thus the forming die members $F_1$, $F_2$ and $F_3$, the pressure plate and the means for moving the pressure plate together comprise actuating means for moving the die members 30.

In practicing the method of this invention for example by employing the embodiment of the apparatus shown in Fig. 1, the container forming operating cycle may start by having the hydraulic power cylinders 24 and 35 raise both the clamping plate and the pressure plate so that the clamping plate will assume a spacing $H_1$ from the base plate 10, with the pressure plate above in turn assuming a distance $H_2$ from the clamping plate.

The web W of thermoplastic sheet material is then advanced over the base plate to a position covering the rectangular apertures 10a, 10b, 10c therein. The retraction of piston rod 25 into the power cylinder 24 will lower the clamping plate and eventually hold the same tightly against the base plate 10 so that the sheet material of the web will become tightly clamped between it and the pressure plate and thus clamped marginally around the respective openings. Thereupon heat is applied for example from the electric heating elements 17 within the box structure B to heat-soften the sheet material exposed in the areas of the apertures until these portions become distendable.

When this condition is reached, operation of the power cylinder 35 will extend the piston rod 36 downwardly to lower the pressure plate 34 into operative relationship with the corner shaping device D and with the clamping plate. This causes the bottom corners $R_1$, $R_2$ and $R_3$ of the complementary die members to enter into camming engagement with the respective fingers 30 as indicated in dot-and-dash lines by the position of the complementary die member F in Fig. 2. Continued downward movement of the pressure plate 34 will therefore swing the fingers 30 downward so that the finger tips will engage the heat-softened area of the sheet material at a plurality of points and distend the same and thereby shape the corners of the article prior to the die members $F_1$, $F_2$, $F_3$ becoming effective with respect to shaping the bottom and finish forming the container.

Figure 4:
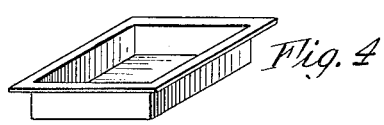
Fig. 4 illustrates the plain flat bottom form of a container producible by the method of this invention.
Figure 5:
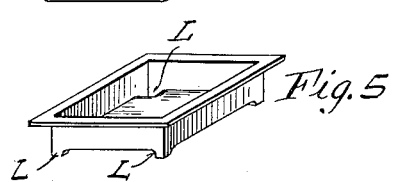
Fig. 5 illustrates an alternative form of the container with corner bottom pockets to constitute legs.
Figure 6:
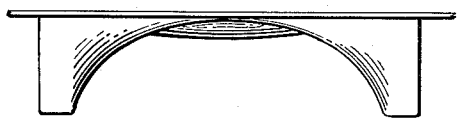
Figs. 6, 7, 8 illustrate progressive stages in the formation of the flat bottomed form of the container shown in Fig. 4.
Figure 7:
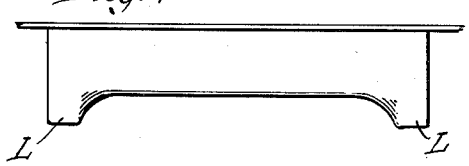
Figure 8:
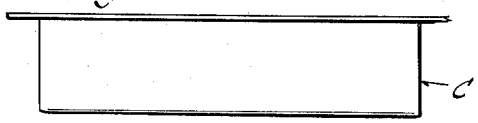

The fingers 30 will thus first produce sharply formed vertical corner portions of the container and thereby establish a preliminary shape thereof such as exemplified in Fig. 6. The hollow die member will continue downwardly to the predetermined end position shown in Fig. 3 to complete the forming operation with the fingers then lodging vertically and in a complementary fashion in the cam recess $R_1$, $R_2$, $R_3$ of the complementary forming members, producing the finished shape exemplified in Fig. 8, with an intermediate stage of the formation being shown in the example of Fig. 7. This forming operation may be aided by applying suction interiorly to the container bottom through a suction means in the form of a suction box 39 formed internally of the complementary hollow forming dies. Suction may then be applied through a connection 39a after the parts have reached the end position shown in Fig. 3. The suction effective through suction holes 40 provided in the bottom of the die will then draw the container bottom against the backing surface of the hollow box-shaped forming die and thus help in attaining the present bottom shape desired. The bottom shape thus attainable may be plain and flat as exemplified in the products of Figs. 4 and 8. Alternatively, if the downward movement of the hollow forming members is stopped short of being flush with the tips of the then vertical fingers 30, the bottom shape of the container will be contoured in the manner exemplified in the products shown in Figs. 5 and 7, providing hollow corner pockets L to serve as corner pads or legs for the container.

Figure 3:
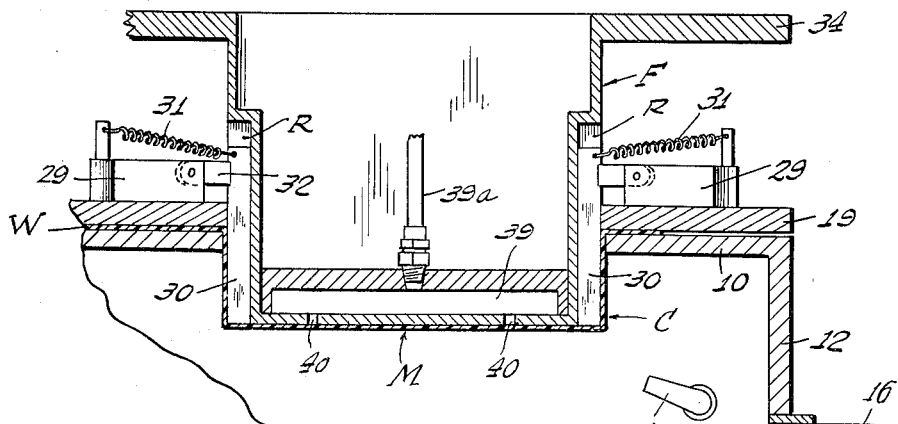
Fig. 3 is a vertical sectional fragmentary view of the apparatus of Fig. 1, showing the parts in final container forming position.

After finish forming the container in the manner shown in Fig. 3, and with all the forming dies still in place a blast of cooling air may be directed from the nozzle N externally against the container bottom M (see Fig. 3) in order that the distended thermoplastic material may be restored promptly to its normal solid or non-plasticized condition. Thereupon, the pressure plate may be raised withdrawing the hollow die member from the formed container while freeing the corner forming fingers 30 and allowing the springs 31 to return them to their original horizontally pointed position shown in Figs. 1 and 2. Subsequently the clamping plate 19 may be raised to release the sheet material with the formed container shapes therein, which may be cut apart and trimmed to provide the container products illustrated and exemplified in Figs. 4 and 5.

Figure 9:
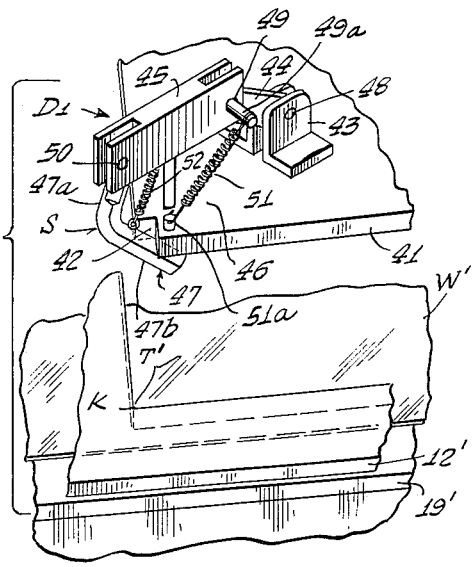
Fig. 9 is a perspective detail view of another form of the corner forming device as related to the sheet material held by the clamping plate.
Figure 10:
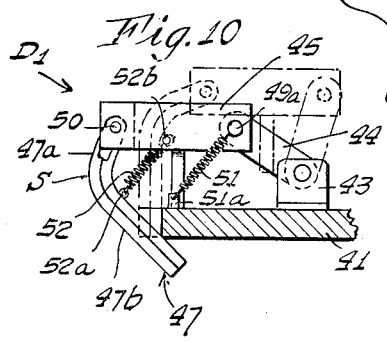
Fig. 10 is a side view of the device shown in Fig. 9, showing the corner forming member in its respective end positions.

According to another form of the apparatus illustrated in Figs. 9 and 10, a corner forming device $D_1$ is mounted upon each corner of a bottom forming die plate 41 provided in lieu of the hollow box-shaped die members of the embodiment of Fig. 1. The forming plate 41 has at each corner a corner recess 42 corresponding to the recesses $R_1$, $R_2$, $R_3$ in the die members $F_1$, $F_2$, $F_3$ of Fig. 1, so that the device $D_1$ will move up and down bodily with the bottom forming plate 41 instead of moving with the pressure plate 19.

Accordingly, the device $D_1$ comprises a base or bracket 43 with a train of links 44 and 45 pivotally connected thereto so as to be swingable in a vertical plane diagonally of the corner portion 46 of the plate. The outer end of link 45 in turn has pivotally connected thereto and depending therefrom a corner forming die member or finger 47 formed with a rectangular bend S defining an inner shank 47a and an outer shank 47b, with the outer shank normally pointing downwardly and inwardly with respect to the plate and lodging in the recessed corner portion in the manner shown in Fig. 10. The train of links 44 and 45 is defined by pivots 48, 49, 50, the pivot 49 providing a pin or projection 49a for the attachment thereto of a tension spring 51 anchored at 51a upon the plate 41. A second tension spring 52 attaches to an intermediate point 52a of the forming finger and to an intermediate point 52b of link 45.

As the plate 41 is lowered (see Fig. 9) the bent corner forming finger 47 will engage the sheet material W' clamped between a base plate 12' and a pressure plate 19', a distance T' from corner point K of a respective opening in the pressure plate. Further downward movement of die plate 41 will effect an initial phase of corner distension and corner formation upon the sheet material as the finger comes into contact with the corner point K of the opening. Final downward movement results in the parts of the device assuming the position shown in dot-and-dash as a result of the bend S of the finger having entered into camming engagement with the corner point K of the opening, with the free end portion of the finger finally assuming its complementary position in the corner recess 42 of plate 41 as indicated in the dot-and-dash line showing within Fig. 10.

Variations and modifications may be made within the scope of the claims and portions of the improvements may be used without others.

I claim:

1. Apparatus for forming plastic containers from thermoplastic sheet material, comprising in combination a base member having a polygonal opening, means for marginally clamping said sheet material over the opening, a heater for heating the area of the sheet covering said opening, a corner forming device for each corner portion of said opening having a corner forming die member extending inwardly and diagonally of the included angle of the corner and movable in a plane substantially perpendicular to the plane of the sheet material, actuating means movable toward and away from said base member for engaging the corner forming die members between said actuating means and said clamping means and substantially simultaneously moving said die members for engaging the sheet material at points spaced inwardly from the edge of said opening and simultaneously distending the sheet transversely of the plane of the opening and in a direction parallel to the plane of the opening for forming the polygonal corner portions of the container to provide a preliminary shape thereof, said corner forming devices being mounted on one of said means, and mechanical forming means complementary to said corner forming die members applicable internally of the container for finish forming the preliminary shape, by forming the bottom and the side walls of the container so that the corner forming die members together with the complementary forming means define the shape of the container.

2. A method of forming thermoplastic sheet material which comprises clamping the sheet around the peripheral edge thereof, heating the sheet, engaging the sheet at a plurality of points spaced inwardly from the clamped edge and simultaneously distending the sheet transversely of the plane of the sheet and in a direction parallel to the plane of the sheet, whereby the portion of the sheet within the points of engagement is stretched and the portion of the sheet between the points of engagement and the clamped edge is stretched, and causing a cooling of the sheet.

3. A method of forming thermoplastic sheet material which comprises placing the sheet over an aperture and clamping the sheet at the edge of the aperture, heating the sheet, engaging the sheet at a plurality of points spaced inwardly from the edge of the aperture and simultaneously distending the sheet transversely of the plane of the aperture and in a direction parallel to the plane of the aperture, whereby the portion of the sheet within the points of engagement is stretched and the portion of the sheet between the points of engagement and the edge of the aperture is stretched, and causing a cooling of the sheet.

4. A method of forming thermoplastic sheet material which comprises placing the sheet over an aperture and clamping the sheet at the edge of the aperture, heating the sheet, engaging the sheet at a plurality of points spaced inwardly from the edge of the aperture and simultaneously distending the sheet transversely of the plane of the aperture and in a direction parallel to the plane of the aperture until the points of engagement are opposite the edge of the aperture in a direction perpendicular to the plane of the aperture, whereby the portion of the sheet within the points of engagement is stretched and the portion of the sheet between the points of engagement and the edge of the aperture is stretched, and causing a cooling of the sheet.

5. A method of forming polyhedral containers from thermoplastic sheet material, which comprises the steps of placing the sheet material over a polygonal opening in a base plate, clamping the sheet to the base plate around the edges of the opening, heating the sheet, engaging the sheet at a plurality of points spaced inwardly from the edge of the opening and simultaneously distending the sheet transversely of the plane of the opening and in a direction parallel to the plane of the opening until the points of engagement are opposite the edge of the opening in a direction perpendicular to the plane of the opening, whereby the portion of the sheet within the points of engagement is stretched and the portion of the sheet between the points of engagement and the edge of the aperture is stretched, and causing a cooling of the sheet.

6. A method of forming polyhedral containers from thermoplastic sheet meterial, which comprises the steps of placing the sheet material over a polygonal opening in a base plate, clamping the sheet to the base plate around the edges of the opening, heating the sheet, engaging the sheet at a plurality of points spaced inwardly from the edge of the opening and simultaneously distending the sheet transversely of the plane of the opening and in a direction parallel to the plane of the opening until the points of engagement are opposite the edge of the opening in a direction perpendicular to the plane of the opening, whereby the portion of the sheet within the points of engagement is stretched and the portion of the sheet betwen the points of engagement and the edge of the aperture is stretched, and while maintaining the points of engagement thus positioned, completing the forming by mechanically depressing the portion of the sheet within the points of engagement to a plane short of the ends of said points of engagement, said points of engagement thereby constituting corner supports for the container, and causing a cooling of the sheet.

7. A method as claimed in claim 6 in which the step of mechanically depressing the sheet includes applying suction interiorly of the thus partially formed container for shaping the container against a backing surface.

8. A method as claimed in claim 2 in which the step of causing cooling of the sheet includes applying an air blast against the exterior of the container.

9. Apparatus for forming plastic containers from thermoplastic sheet material, comprising in combination a base plate having a polygonal opening, means for marginally clamping said sheet material over the opening, a heater for heating the area of the sheet covering the opening, a corner forming device for each corner portion of said opening having a corner forming die member extending inwardly and diagonally of the included angle of the corner and movable transversely of as well as parallel to the plane of the opening in a plane substantially perpendicular to the plane of the sheet material, actuating means movable toward and away from said base plate for engaging the corner forming die members between said actuating means and said clamping means and substantially simultaneously moving said corner forming die members for engaging the sheet material at points spaced inwardly from the edge of said opening and simultaneously distending the sheet transversely of the plane of the opening and in a direction parallel to the plane of the opening for forming the polygonal corner portions of the container to provide a preliminary shape thereof, said corner forming devices being mounted on one of said means, and mechanical forming means complementary to said corner forming die members appliable internally of the container for finish forming the preliminary shape, by forming the bottom and the side walls of the container so that the corner forming die members together with the complementary forming means define the shape of the container, suction means on said mechanical forming means for applying suction interiorly of the container to the container bottom for drawing it against said mechanical forming means, and air blast means directed toward said mechanical forming means below said base plate.

10. Apparatus for forming plastic containers from thermoplastic sheet material, comprising in combination a base plate having a polygonal opening, means for marginally clamping said sheet material over the opening, a heater for heating the area of the sheet covering the opening, a corner forming device for each corner portion of said opening having a corner forming die member extending inwardly and diagonally of the included angle of the corner and movable transversely of as well parallel to the plane of the opening in a plane substantially perpendicular to the plane of the sheet material, actuating means movable toward and away from said base plate for engaging the corner forming die members between said actuating means and said clamping means and substantially simultaneously moving said corner forming die members for engaging the sheet material at points spaced inwardly from the edge of said opening and simultaneously distending the sheet transversely of the plane of said opening and in a direction parallel to the plane of the opening for forming the polygonal corner portions of the container to provide a preliminary shape thereof said corner forming devices being mounted on one of said means.

11. Apparatus as claimed in claim 10 in which said means for marginally clamping comprises a clamping plate, and said corner forming device is mounted on said clamping plate and comprises a pivot on said clamping plate, an arm rotatably mounted on said pivot and on which said corner forming die member is fixed for pivoting to a position perpendicular to the plane of the opening and extending through the opening, and a spring between said corner forming die member and said clamping plate urging said corner forming die member toward a position parallel to the plane of said opening, and said actuating means comprises a forming die member movable perpendicularly to the plane of the opening in said base plate from the side of said base plate on which said pivot is positioned, said forming die member having a cross section complementary to said opening and having a recess in each corner thereof extending perpendicularly to the plane of said opening and having a shape complementary to said corner forming die.

12. Apparatus as claimed in claim 10 in which said actuating means comprises a forming die member movable perpendicularly to the plane of the opening in said base plate and having a cross section complementary to said opening and having a recess in each corner thereof having a cross section complementary to the cross section of said corner forming die member, and each of said corner forming devices includes a pivot on said forming die member adjacent a corner thereof, said corner forming die member being articulated to said pivot and movable to a position perpendicular to the plane of the opening and extending through the recess in the corner of said forming die member, and spring means connecting said actuating member and said corner forming die member and urging said corner forming die member toward a position parallel to the plane of said opening.

References Cited in the file of this patent

UNITED STATES PATENTS

| | | |
|---|---|---|
| 448,748 | Comings | Mar. 24, 1891 |
| 1,035,984 | Molde | Aug. 20, 1912 |
| 1,668,349 | Baum | May 1, 1928 |
| 2,221,197 | Martin | Nov. 12, 1940 |
| 2,223,321 | Kempe | Nov. 26, 1940 |
| 2,442,338 | Borkland | June 1, 1948 |
| 2,531,539 | Smith | Nov. 28, 1950 |
| 2,547,275 | Lyon | Apr. 3, 1951 |
| 2,547,331 | Lent | Apr. 3, 1951 |
| 2,736,065 | Wilcox | Feb. 28, 1956 |
| 2,760,231 | St. Clair | Aug. 28, 1956 |